United States Patent
Heatley et al.

(10) Patent No.: US 11,228,732 B2
(45) Date of Patent: Jan. 18, 2022

(54) SYSTEM FOR CONNECTING A COMPUTER WITH A VIDEO CONFERENCE ENDSYSTEM

(71) Applicant: StarLeaf Ltd, London (GB)

(72) Inventors: Richard Piers Heatley, Cambridge (GB); Samuel Thomas Jansen, Royston (GB); Alexander James Coplan, Cambridge (GB); Gavin Charles Jones, Slough (GB)

(73) Assignee: StarLeaf Ltd., London (GB)

( * ) Notice: Subject to any disclaimer, the term of this patent is extended or adjusted under 35 U.S.C. 154(b) by 0 days.

(21) Appl. No.: 16/749,720

(22) Filed: Jan. 22, 2020

(65) Prior Publication Data
US 2020/0236326 A1 Jul. 23, 2020

(30) Foreign Application Priority Data
Jan. 22, 2019 (GB) ..................................... 1900878

(51) Int. Cl.
*H04N 7/15* (2006.01)
*H04L 29/06* (2006.01)

(52) U.S. Cl.
CPC ........... *H04N 7/152* (2013.01); *H04L 63/166* (2013.01)

(58) Field of Classification Search
USPC ............. 348/14.01, 14.09; 370/353; 455/418
See application file for complete search history.

(56) References Cited

U.S. PATENT DOCUMENTS

| 6,640,239 B1* | 10/2003 | Gidwani | H04L 29/06027 370/353 |
| 2013/0102250 A1* | 4/2013 | Mutikainen | H04W 4/00 455/41.2 |
| 2013/0342637 A1* | 12/2013 | Felkai | H04L 69/24 348/14.08 |
| 2014/0362169 A1* | 12/2014 | Sheeley | H04N 7/147 348/14.08 |
| 2016/0021236 A1* | 1/2016 | Nukala | H04M 1/72451 455/418 |

(Continued)

FOREIGN PATENT DOCUMENTS

WO 2014/172678 A1 10/2014

OTHER PUBLICATIONS

Combined Search and Examination Report under Secitons 17 and 18(3) dated Jul. 18, 2019 for Application No. GB1900878.8, 8 pages.

(Continued)

*Primary Examiner* — Maria El-Zoobi
(74) *Attorney, Agent, or Firm* — Knobbe, Martens Olson & Bear LLP

(57) ABSTRACT

Embodiments can include a system for connecting a computer with a video conference endsystem. The system can comprise a first device for connecting to a computer; and a second device for connecting to a video conference endsystem. The system can be configured to provide a bidirectional channel between the first device and the second device such that, in use, the first device is connected to a computer and the second device is connected to the video conference endsystem to provide a bidirectional channel between the computer and the video conference endsystem.

25 Claims, 3 Drawing Sheets

(56) References Cited

U.S. PATENT DOCUMENTS

| | | | |
|---|---|---|---|
| 2016/0191852 A1* | 6/2016 | Abou-Chakra | H04L 12/1822 |
| | | | 348/14.09 |
| 2018/0063481 A1 | 3/2018 | Yu | |
| 2018/0081843 A1* | 3/2018 | Kadgi | G06F 13/20 |
| 2019/0089752 A1* | 3/2019 | Choe | H04L 12/2829 |
| 2019/0364246 A1* | 11/2019 | Krizan | H04N 7/15 |
| 2020/0183525 A1* | 6/2020 | Liu | G06F 3/1423 |

OTHER PUBLICATIONS

Wikipedia.com, USB-C, Jan. 13, 2019, available at https://en.wikipedia.org/w/index/pho?title=USB-C&oldid=878259615, 11 pages.
Wikipedia.com, USB-C, 2018, available at https://en.wikipedia.org/w/index.pho?title=HDMI&oldid=873556849, 30 pages.

* cited by examiner

PRIOR ART

SYSTEM FOR CONNECTING A COMPUTER WITH A VIDEO CONFERENCE ENDSYSTEM

FIELD OF THE DISCLOSURE

The present disclosure relates to a system for connecting a computer with a video conference endsystem.

BACKGROUND OF THE DISCLOSURE

The secondary content channel of a videoconference is to enable a user to share video content for instance from a document camera or the display of a laptop with the other participants in the conference.

FIG. 1 illustrates the known method for connecting a content device 5 (such as a laptop computer) via a High-Definition Multimedia Interface (HDMI) cable 6 to a videoconferencing endsystem 1 with a camera 4, a far-end camera display 2 and a content display 3. The system is connected to a network 7, and a control interface 8.

This arrangement provides a unidirectional media channel. That is to say, media content is sent from the content device 5 to the videoconferencing endsystem 1 through HDMI cable 6. There is no control channel except for a simple start/stop mechanism from laptop to endsystem to start or stop the content being displayed on the videoconferencing endsystem.

SUMMARY OF THE DISCLOSURE

The inventors of the arrangements described herein have appreciated that known arrangements of the type described above for connecting a computer with a video conference endsystem, whilst conceptually simple, are a frustrating part of the meeting process because of incompatibilities with software, connectors, devices and, in particular, poor control.

In particular, the inventors of the arrangements described herein have appreciated that the control channel of known arrangements causes frustration for users of videoconferencing endsystems. For example, in the situation where a person wishes to use their laptop computer to join a meeting in an ad-hoc allocated meeting room. Because the meeting room was not booked, it knows nothing of the conference. However, the laptop already knows about the conference connection details because of a conferencing app or calendar app present on the device, but this information is not available to the videoconferencing system via a traditional interconnect, so details must be entered again on the endsystem's control interface for the user to join the conference.

The inventors of the arrangements described herein have appreciated that these problems are mitigated by providing a bidirectional channel between a computer, for example, a laptop computer and a video conference endsystem. The bidirectional channel may comprise a bidirectional control channel and a bidirectional media channel. In this way, both control and media can be sent from the computer to the video conference endsystem and from the video conference endsystem to the computer. In the arrangements described, a first device, such as a USB connector or other physical connector, is provided, for connecting to a computer; and a second device, such as another USB connector or other physical connector, is provided for connecting to a video conference endsystem. The bidirectional channel is provided between the first device and the second device and thus between the computer and the video conference end system.

In the examples described, the bidirectional channel uses transport layer security (TLS) protocol.

This arrangement provides a direct attachment between the computer and the video conference endsystem which means that there is bidirectional flow of both control and media to provide a rich feature set. Providing local connection and bidirectional control means that there may be a trust issue if the computer allows the video conference endsystem to control the computer. The use of TLS including trusted certificate authorities provides a secure bidirectional channel.

Examples disclosed herein include a method and system to establish a direct bidirectional control channel and a bidirectional media channel between a user's computing device such as a laptop, and a videoconferencing endsystem. These channels allow for, for example:

- transfer of conference information between the laptop and the endsystem for the purposes of joining or hand-off;
- control of the laptop from the videoconferencing endsystem during a presentation;
- control of the videoconferencing endsystem from the laptop to supplement or replace the videoconferencing control surface;
- control and sharing of the videoconferencing endsystem's peripherals by the laptop.

Examples disclosed herein address the challenges described above by providing methods and systems for providing a rich interconnect between a user's computing device or computer such as a laptop or tablet, and a videoconferencing endsystem.

A system is described for augmenting a secondary media content interface from a computing device or video source to a videoconferencing endsystem with a control channel and bidirectional media channel.

In one example, the system connects with the user's computing device using a universal serial bus (USB) connection and to the endsystem's control unit using a USB connection. The system identifies itself to the endsystem's control unit as a content channel provider. It also identifies itself to the user's computing device using the industry standard method for communications peripherals in which a peripheral identifies firstly as a storage device for the user to install software, and subsequently as a channel specifically for the software.

In another example, the system connects with the user's computing device using a USB connection and to the endsystem using an Ethernet or powered Ethernet connection. The system identifies itself to the user's computing device using the industry standard method for communications peripherals in which a peripheral identifies firstly as a storage device for the user to install software, and subsequently as a channel specifically for the software.

In a further example, the system connects with the user's computing device via HDMI and to the endsystem using a USB connection. The system identifies itself to the endsystem's control unit as a content channel provider. It also identifies itself to the user's computing device as a smart display. In this example, a control channel may be established between the device and the videoconferencing endsystem for transmission of auxiliary control information such as consumer electronic control (CEC).

In a yet further example, the system connects with the user's computing device using a USB connection and to the endsystem using a wireless local area network connection, such as WiFi (registered trade mark).

In another example, multiple instances of the system connect each with a user's computing device using a USB connection and to the endsystem using powered Ethernet. The control channel may be used for selecting the currently active source for the videoconference.

Once the user has installed or run the software on the computing device, it first uses the device to establish a secure TLS channel to a far-end service with a trusted digital certificate. This guarantees that there can be no man-in-the-middle attack that could be attempted by intercepting the cable.

The far-end service may be in the videoconferencing endpoint itself, or it may be in the cloud.

Typically this service is a configuration service which allows the software to identify the target address and security credentials for the bidirectional control and media channels. These channels are established using TLS or some other secure protocol.

For additional protection, the data through the system may be tunnelled through a TLS channel to the videoconferencing endsystem that is terminated by the system described herein using a client-side TLS certificate to identify that a legitimate instance of the system is being used.

Once trust is established between the software in the user's device and the videoconferencing endsystem, negotiation can take place as to the purpose of the connection.

A User Preferences dialog may be employed to determine what permissions the user is willing to delegate to the videoconferencing endsystem.

The interface to the user's computing device may be connected by USB2.0, USB3.0 or USB-C. A multi-headed connector may be used to allow the user whatever they need. When USB-C is in use, the system may provide charging power to the user's device.

The disclosure in its various aspects is defined in the independent claims below to which reference should now be made. Optional features are set forth in the dependent claims.

Arrangements are described in more detail below and take the form of a system for connecting a computer with a video conference endsystem. The system comprises a first device for connecting to a computer; and a second device for connecting to a video conference endsystem. The system is configured to provide a bidirectional channel between the first device and the second device such that, in use, the first device is connected to a computer and the second device is connected to the video conference endsystem to provide a bidirectional channel between the computer and the video conference endsystem.

BRIEF DESCRIPTION OF THE DRAWINGS

The embodiments will be described in more detail, by way of example, with reference to the accompanying drawings, in which.

DETAILED DESCRIPTION

Figure 1:
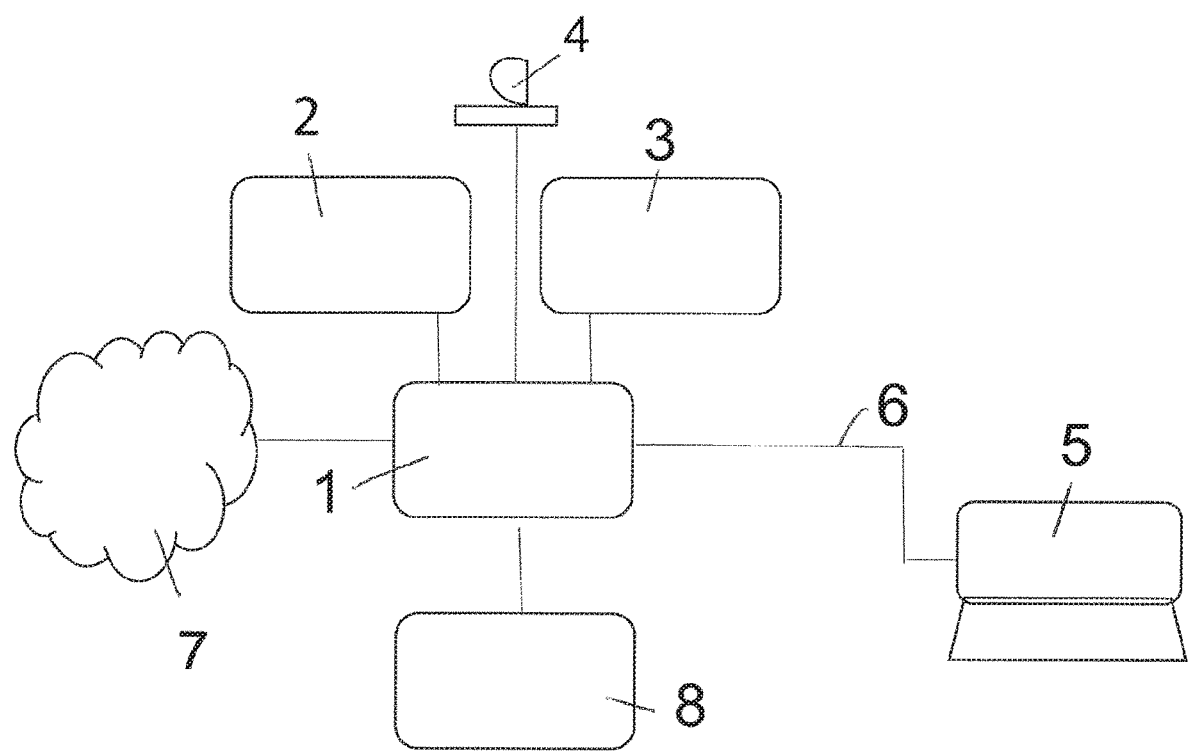
FIG. 1 is a schematic diagram of a known system for connecting a computer with a video conference endsystem according to the prior art.

Example systems for connecting a computer or computers with a video conference endsystem will now be described with reference to FIGS. 2 and 3. The examples of FIGS. 2 and 3 are similar, in many respects, to the prior art system illustrated in FIG. 1 and like features have been given like reference numerals.

Figure 2:
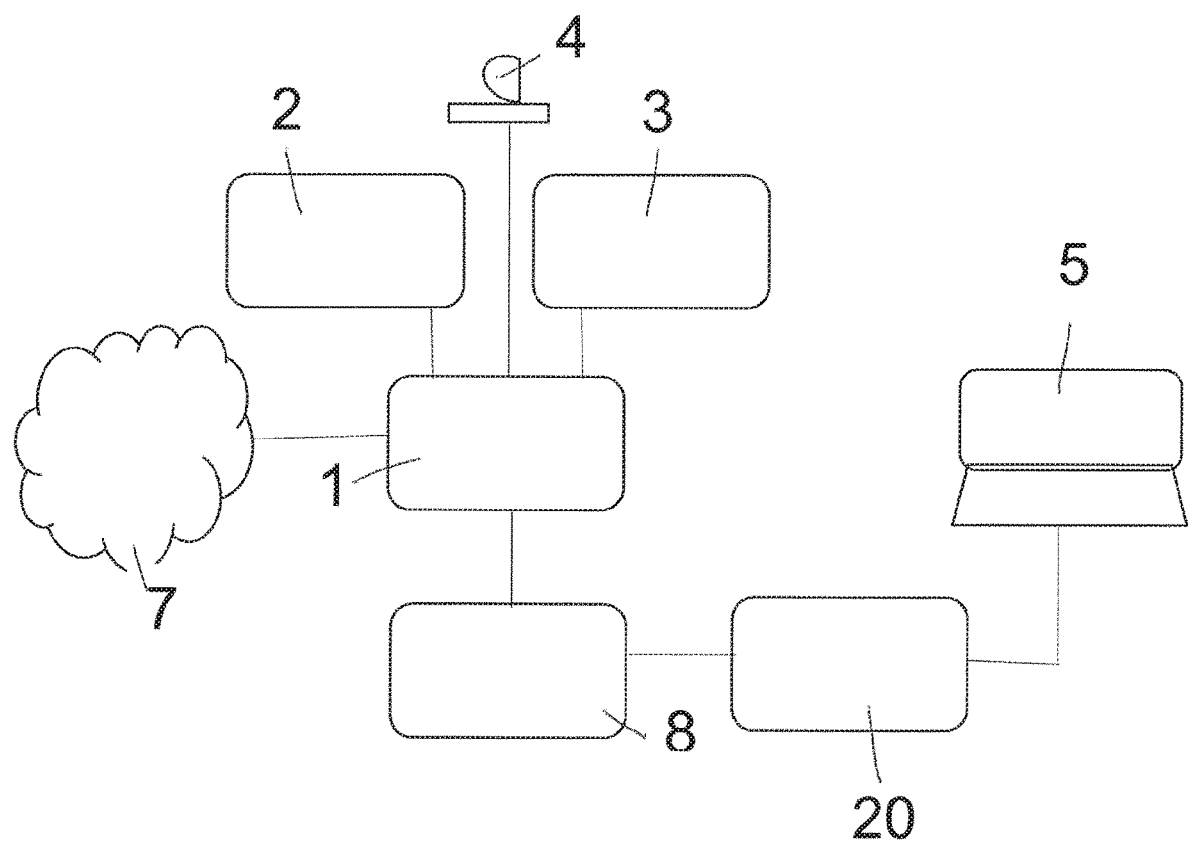
FIG. 2 is a schematic diagram of a system for connecting a computer with a video conference endsystem embodying an aspect of the disclosure.
Figure 3:
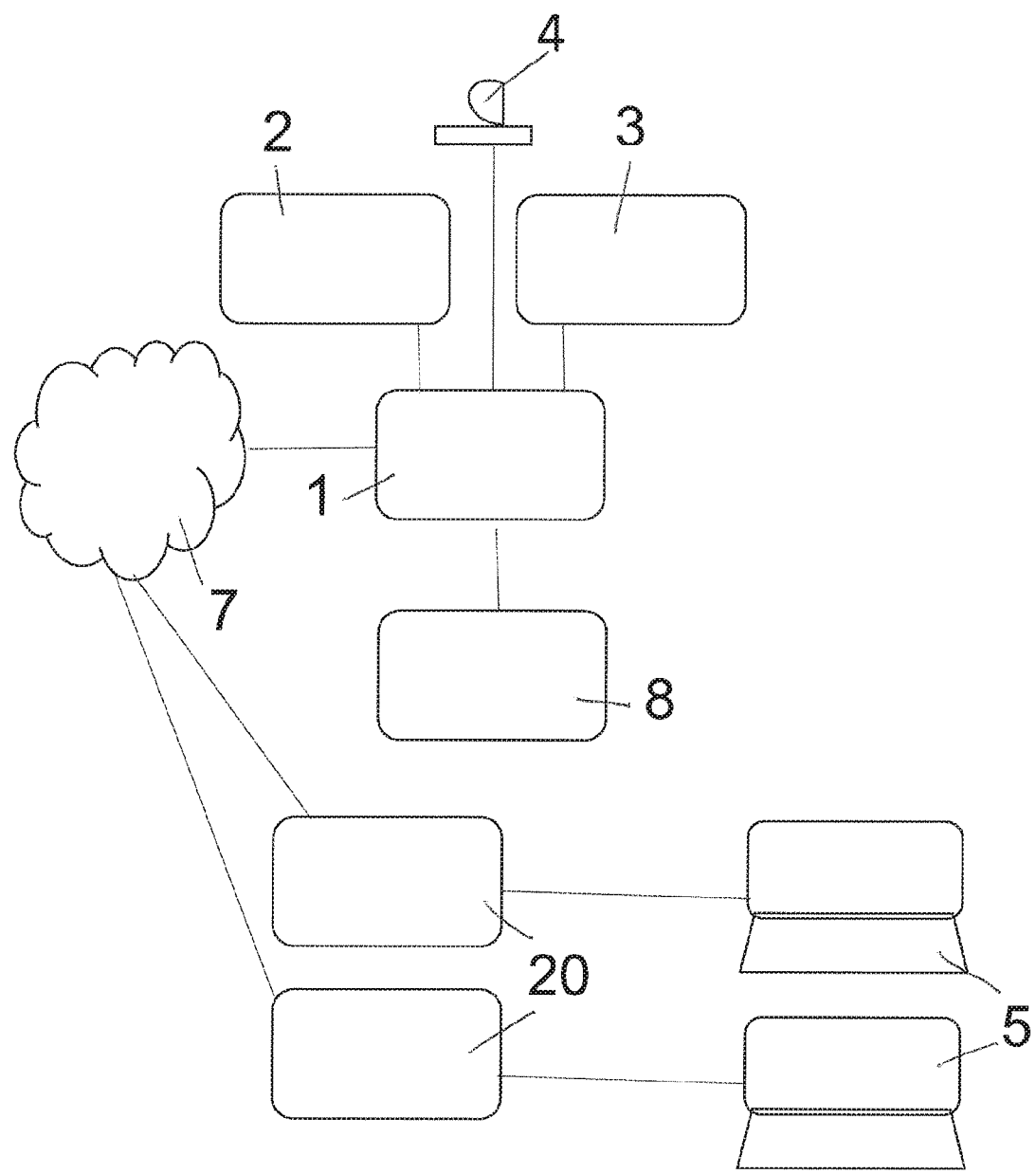
FIG. 3 is a schematic diagram of another system for connecting a computer with a video conference endsystem embodying an aspect of the present disclosure.

FIG. 2 includes a system 20 for connecting a computer 5 with a video conference endsystem 1. In this example, the system connects between the control interface 8 for the video conference endsystem 1 and the user's content device, computer, or laptop computer 5. In this example, the video conference endsystem is connected to a far end video conference system that is in the video conference endsystem.

The system 20 includes a first device for connecting to the computer 5. The first device forms a physical mechanical and electrical connection with the computer. In this example, the first device is a USB connector that connects to the computer using a USB connection. However, the connection may be, for example, a High-Definition Multimedia Interface, HDMI, connection; an Ethernet connection; or a powered Ethernet connection. Alternatively, the first device may form a wireless communication connection with the computer, such as a wireless local area network connection such as WiFi (registered trade mark).

The system 20 includes a second device for connecting to the control interface 8 of the video conference endsystem 1. The second device forms a physical mechanical and electrical connection with the control interface of the video conference endsystem. In this example, the second device is a USB connector that connects to the control interface using a USB connection. However, the connection may be, for example, a High-Definition Multimedia Interface, HDMI, connection; an Ethernet connection; or a powered Ethernet connection. Alternatively, the second device may form a wireless communication connection with the control interface, such as a wireless local area network connection such as WiFi (registered trade mark).

A bidirectional channel is formed between the first device and the second device. In this way, a bidirectional channel is provided between the computer 5 and the video conference endsystem 1. In this example, the bidirectional channel includes a bidirectional control channel and a bidirectional media channel. The channel is secure by using, in this example, TLS protocol for the control and media channel.

The computer 5 in this example, is a laptop computer. However, the computer may be, for example, a desktop computer, a tablet computer or a smartphone.

The USB connections described above may be, for example, a USB2.0, USB3.0 or USB-C connection, such as to provide charging power to the computer 5.

In this example, the first device is connected to the computer 5 using one connector of a multi-headed connector, such as including at least one of a USB2.0, USB3.0 or USB-C connector. The second device is connected to the video conference end system using one connector of a multi-headed connector, such as including at least one of a USB2.0, USB3.0 or USB-C connector. The use of multi-headed connectors provides good usability of the system.

In this example, the video conference endsystem 1 is connected to a far end video conference system that is in the video conference. However, the far end video conference system may be connected via a server, such as a remote server, for example the cloud.

The system 20 identifies itself to the endsystem's control unit 8 as a content channel provider. It also identifies itself to the computer 5 using the industry standard method for communications peripherals in which a peripheral identifies firstly as a storage device for the user to install software, and subsequently as a channel specifically for the software.

Examples of the types of transactions that may occur over the two-way control channel are as follows.

Hand-Off for an Active Conference

The user's device or computer 5 is already running a videoconferencing application (app) with an active conference. The room videoconferencing endsystem 1 is idle.

The software for the system that has been installed on the user's computer 5 detects the new connection of the room videoconferencing endsystem 1. The endsystem provides its identity and address to the computer software which instructs the conferencing app on the computer to hand off the conference to the room system's address.

The connection to the conference is handed off from the user's device 5 to the room system or videoconference system 1 to which the user's device has been connected, allowing the conference to continue on the better conferencing system. The method for this handoff depends on the videoconferencing system's capabilities. For instance it may involve a call transfer, or may involve a disconnection and reconnection.

Identification and Transfer of Pending Conference

The user's computer 5 detects the new connection of the room videoconferencing endsystem 1. This triggers the software in the computer to identify pending conferences in the user's calendar.

The user's device 5 has a calendar application which is scanned to find any videoconferences within a predefined time period, such as that are active currently or in the immediate future (such as within 10 minutes, within 30 minutes or within one hour). If found, the videoconference details (name, time, directory number, conference number etc) are extracted from the calendar entry and are passed to the room system. The videoconferencing room system 1 then offers a simple join button on its control interface which will join the room system to the specified conference when pressed by the user.

Fostering of Room System Peripherals

The user's device 5 is already running a videoconferencing app and may or may not have an active conference. The room videoconferencing endsystem 1 is idle.

The user's computer 5 detects the new connecting of the room endsystem 1 and the software informs the user's conferencing app that new peripherals are available.

The peripherals attached to the room system (display 3, camera 4, speakers, document camera etc.) are temporarily reassigned to the user's laptop 5 and operate as if they are directly attached, allowing the user to take advantage of the better camera and display in the room without handing off the conference to the room system.

One method of achieving this is for the system 20 to emulate generic USB devices that mimic the room system's peripherals, and media streams are created from the videoconferencing endsystem 1 to the system to allow it to stream to the user's device 5.

On disconnection, the peripherals return control to the room videoconferencing endsystem 1.

Sharing of Content

The room videoconferencing endsystem 1 is already running a conference.

The user's computer 5 detects the new connection of the room system 1 and the software activates.

The system 20 is instructed, for instance, via its associated application (app) or by a button on the device 5 or by a button on the videoconferencing endsystem's control interface 8, to start streaming content.

The associated software for the system 20 may give an option as to whether it should emulate a second screen on the user's device 5 so that a slide-show can be shown in "presenter mode", or should copy the whole of the existing screen, or should copy just one application window from the screen.

The associated software for the system 20 copies the appropriate screen area and produces a video stream.

The video stream may be compressed by the host computer, or may be passed uncompressed or lightly compressed to the system for full video compression. This depends on the capabilities of the embodiment of the system 20, and the capabilities and desired additional processing burden that is acceptable be placed on the user's laptop 5. The stream is then sent over a media channel to the room video endsystem 1.

FIG. 3 illustrates another example system 20 for connecting a computer 5 with a video conference endsystem 1. It is the same in most respects to the example of FIG. 2. However, in this example there are a plurality of computers 5 with a bidirectional channel connection through a network 7 to the video conference endsystem.

In more detail, in this example, there are several examples or instances of the system 20 that connect between the network 7 and the user's content device, computer or laptop computer 5. In this example, the control interface 8 of the video conference end system is used to select the current content source. That is to say, which one of the plurality of computers 5 to provide content. This is controlled by the secure, bidirectional channels using TLS protocol that are established between the computers 5 and the video conference endsystem 1. Alternatively, the software in the user's computer may be used to indicate that it should supply the content stream, or a button on the system 20 may indicate that it should supply the content stream. In the case of a system attached via HDMI, the CEC protocol may be used to indicate that content should be streamed, or the detection of a new HDMI signal may cause this indication.

Embodiments of the present disclosure have been described. It will be appreciated that variations and modifications may be made to the described embodiments within the scope of the present disclosure.

What is claimed is:

1. A system for connecting a computer with a video conference system, the system comprising:
  a first device for connecting to a computer; and
  a second device for connecting to a video conference system configured to make and receive video calls, wherein the system is configured to provide a bidirectional channel between the first device and the second device such that, in use, the first device is connected to the computer and the second device is connected to the video conference system to provide the bidirectional channel between the computer and the video conference system, wherein the bidirectional channel is configured to facilitate hand off of a videoconference from the computer to the video conference system, the hand off being performed responsive to establishing the bidirectional channel,
  wherein responsive to the first device being connected to the computer and responsive to the second device establishing a connection to the video conference system, the system is configured to automatically:
    transmit a notification to the computer that the second device has been connected to the video conference system, wherein the notification includes an identifier for identifying the second device;
    automatically trigger identification of pending conferences in a calendar of the computer for videoconferences within a time threshold and in the same room as where the system is positioned; and provide an alert to the computer, wherein the alert initiates a user interface to enable the computer to join a videoconference in the identified pending conferences.

2. A system according to claim 1, wherein the bidirectional channel comprises a bidirectional control channel.

3. A system according to claim 1, wherein the bidirectional channel comprises a bidirectional media channel.

4. A system according to claim 1, wherein the bidirectional channel is secure.

5. A system according to claim 1, wherein the bidirectional channel uses transport layer security, TLS, protocol.

6. A system according to claim 1, wherein the computer comprises a laptop computer, a desktop computer, a tablet computer or a smartphone.

7. A system according to claim 1, wherein, in use, the first device is connected to the computer using a physical connection.

8. A system according to claim 1, wherein, in use, the second device is connected to the video conference system using a physical connection.

9. A system according to claim 1, wherein, in use, the first device is connected to the computer using a universal serial bus, USB, connection; a High-Definition Multimedia Interface, HDMI, connection; an Ethernet connection; a powered Ethernet connection or a wireless local area network connection.

10. A system according to claim 9, wherein the USB connection is a USB2.0, USB3.0 or USB-C connection, such as to provide charging power to the computer.

11. A system according to claim 10, wherein, in use, the first device is connected to the computer using one connector of a multi-headed connector including at least one of a USB2.0, USB3.0 or USB-C connector.

12. A system according to claim 1, wherein, in use, the second device is connected to the video conference system using a universal serial bus, USB, connection; a High-Definition Multimedia Interface, HDMI, connection; an Ethernet connection; a powered Ethernet connection; or a wireless local area network connection.

13. A system according to claim 12, wherein the USB connection is a USB2.0, USB3.0 or USB-C connection.

14. A system according to claim 13, wherein, in use, the second device is connected to the video conference system using one connector of a multi-headed connector including at least one of a USB2.0, USB3.0 or USB-C connector.

15. A system according to claim 1, wherein, in use, the video conference system is connected to a far end video conference system.

16. A system according to claim 15, wherein the far end video conference system is implemented on a server.

17. A system according to claim 1, wherein a far end video conference system is in the video conference system.

18. A system according to claim 1, wherein the computer is configured to examine the calendar to find a videoconference in which a user is an attendee within the time threshold and, in response, pass details of the videoconference to the video conference system.

19. A system according to claim 18, wherein the computer is configured to examine the calendar in response to the bidirectional channel being formed.

20. A system according to claim 1, wherein the computer is configured to pass a computer's identity to the video conference system for handing off a videoconference from the computer to the video conference system.

21. A system according to claim 20, wherein the computer is configured to pass the computer's identity to the video conference system in response to the bidirectional channel being formed.

22. A system according to claim 1, wherein the video conference system is configured to inform the computer that peripherals of the video conference system are available for control by the computer.

23. A method for connecting a computer with a video conference system, the method comprising:

connecting a first device to a computer;

connecting a second device to a video conference system configured to make and receive video calls; and providing a bidirectional channel between the first device and the second device, the bidirectional channel further providing a bidirectional channel between the computer and the video conference system, wherein the bidirectional channel is configured to facilitate hand off of a videoconference from the computer to the video conference system, the hand off being performed responsive to establishing the bidirectional channel, wherein responsive to the first device being connected to the computer and responsive to the second device being connected to the video conference system, the method further comprises, automatically:

transmitting a notification to the computer that the second device has been connected to the video conference system, wherein the notification includes an identifier for identifying the second device;

automatically triggering identification of pending conferences in a calendar of the computer for videoconferences within a time threshold and in the same room as where the first and second devices are positioned; and providing an alert to the computer, wherein the alert initiates a user interface to enable the computer to join a videoconference in the identified pending conferences.

24. The system of claim 1, wherein the room is not registered in a room booking system for the videoconference, and the videoconference is registered in the calendar of the computer.

25. The method of claim 23, wherein the room is not registered in a room booking system for the videoconference, and the videoconference is registered in the calendar of the computer.

* * * * *